United States Patent
Katou et al.

(10) Patent No.: US 7,443,771 B2
(45) Date of Patent: Oct. 28, 2008

(54) OBJECTIVE LENS DRIVING APPARATUS HAVING BOTTOM PLATE FORMING A PROJECTING PART

(75) Inventors: Seiichi Katou, Tsuchiura (JP); Akio Yabe, Fujisawa (JP); Hidenao Saito, Yokohama (JP)

(73) Assignee: Hitachi Media Electronics Co., Ltd., Mizusawa-shi (JP)

( * ) Notice: Subject to any disclaimer, the term of this patent is extended or adjusted under 35 U.S.C. 154(b) by 549 days.

(21) Appl. No.: 11/109,661

(22) Filed: Apr. 20, 2005

(65) Prior Publication Data

US 2005/0281144 A1 Dec. 22, 2005

(30) Foreign Application Priority Data

Jun. 16, 2004 (JP) ............................. 2004-177717

(51) Int. Cl.
*G11B 7/00* (2006.01)

(52) U.S. Cl. ................................................. 369/44.15

(58) Field of Classification Search ....................... None
See application file for complete search history.

(56) References Cited

U.S. PATENT DOCUMENTS

| 5,018,836 | A | * | 5/1991 | Noda et al. | 359/814 |
| 5,381,273 | A | * | 1/1995 | Goda | 359/827 |
| 6,034,940 | A | * | 3/2000 | Lee | 720/685 |
| 6,594,223 | B2 | * | 7/2003 | Suzuki et al. | 720/683 |
| 6,857,126 | B2 | * | 2/2005 | Fujikawa | 720/683 |
| 2004/0128679 | A1 | | 7/2004 | Wade | |

FOREIGN PATENT DOCUMENTS

| CN | 1497554 | 5/2004 |
| JP | 2002-312961 | 10/2002 |
| JP | 2002-358675 | 12/2002 |

* cited by examiner

*Primary Examiner*—Joseph Feild
*Assistant Examiner*—Peter Vincent Agustin
(74) *Attorney, Agent, or Firm*—Antonelli, Terry, Stout & Kraus, LLP.

(57) ABSTRACT

It is an object of this invention to increase the rigidity of a movable part and decrease its weight. An objective lens driving apparatus has an objective lens which focuses light on the recording surface of an optical disk. The objective lens is driven by focusing coils in directions approaching and receding from the optical disk and is driven by tracking coils in the radial direction of the optical disk. The objective lens is held by a lens holder. A projecting part projecting outward from the outer side surfaces of the lens holder is formed around the entire peripheral edge of the bottom surface of the lens holder.

7 Claims, 8 Drawing Sheets

CROSS SECTION TAKEN ALONG LINE A-A

COUPLING (DEFORMATION IN X-Y PLANE)

OBJECTIVE LENS DRIVING APPARATUS HAVING BOTTOM PLATE FORMING A PROJECTING PART

BACKGROUND OF THE INVENTION

The present invention relates to an optical disk apparatus which reads data recorded on an optical disk or writes data on the optical disk and an objective lens driving apparatus used for the optical disk apparatus.

An optical disk apparatus performs high-speed data recording/playback by rotating an optical disk at high speed. An objective lens follows high-speed rotation of the optical disk and moves at high speed. For this reason, the movable part of an objective lens driving apparatus needs to increase the thrust per unit mass. High-speed rotation of an optical disk causes a rise in servo band. When the servo band rises, the resonance frequency of the movable part must be increased. JP-A-2002-312961 (pp. 2 to 5 and FIG. 1) describes an objective lens actuator which copes with an increase in resonance frequency of a movable part. In this publication, a protruding part is provided to the lens holder of the objective lens actuator, thereby increasing the rigidity of the movable part.

The objective lens actuator described in JP-A-2002-312961 achieves an increase in rigidity of the movable part. However, the protruding part increases the mass of the movable part. As a result, it is difficult to increase the thrust per unit mass of the objective lens driving apparatus required to record/play back data at high speed.

BRIEF SUMMARY OF THE INVENTION

The present invention has been made in consideration of the conventional drawback, and has as its object to fulfill an increase in rigidity and a decrease in weight of a movable part in an objective lens driving apparatus. It is another object of the present invention to allow an optical disk apparatus having the objective lens driving apparatus to record/play back data on/from an optical disk at high speed with high reliability.

To achieve the aforementioned objects, according to a characteristic feature of the present invention, there is provided an objective lens driving apparatus comprising an objective lens which focuses light on a recording surface of an optical disk and is held by a lens holder, a focusing coil which drives the above described objective lens in directions approaching and receding from the optical disk, and a tracking coil which drives the above described objective lens in a radial direction of the optical disk, wherein the lens holder is shaped like a box having a bottom plate, and an entire peripheral edge of the bottom plate is extended from a periphery of side surfaces of the box to form a projecting part.

In this characteristic feature, the projecting part is preferably located on a side opposite to the above described objective lens with respect to the above described focusing coil and tracking coil. The projecting part is preferably located in a direction receding from an optical axis of the above described objective lens. Desirably, focusing coils are arranged on both left and right sides, respectively, of the above described objective lens, and the projecting part has one of an arrangement in which a projection length at a middle part in a direction of juxtaposition of the two focusing coils is smaller than a projection length at an end in the direction and an arrangement in which a projection thickness at the middle part in the direction of juxtaposition of the two focusing coils is smaller than a projection thickness at the end. A width of the projecting part in a direction perpendicular to the direction of juxtaposition of the two focusing coils may gradually decrease from the middle part to the end in the direction.

To achieve the aforementioned objects, according to another characteristic feature of the present invention, there is provided an objective lens driving apparatus comprising an objective lens which focuses light on a recording surface of an optical disk and is held by a lens holder and focusing coils which drive the above described objective lens in directions approaching and receding from the optical disk, wherein a projecting part is formed on an end face, of a side farther from the optical disk, of the lens holder to suppress vibration generated when driving the above described objective lens. In this characteristic feature, preferably, the above described focusing coils are arranged on both left and right sides of the above described objective lens, and a space in a direction of an optical axis is formed in each of the above described focusing coils. The projecting part is preferably a balance weight in a direction of an optical axis of the above described objective lens.

To achieve the aforementioned objects, according to still another characteristic feature of the present invention, the aforementioned objective lens driving apparatus is mounted on an optical disk apparatus which plays back information of an optical disk and records information on the optical disk.

According to the present invention, a projecting part is formed around the entire peripheral edge of the bottom surface of the lens holder of an objective lens driving apparatus. This arrangement makes it possible to increase the rigidity of a movable part and decrease its weight. Accordingly, the resonance frequency of the movable part in the objective lens driving apparatus can be increased to a higher value, and the servo band required for high-speed data recording/playback can be raised. In addition, the power consumption can be decreased.

Other objects, features and advantages of the invention will become apparent from the following description of the embodiments of the invention taken in conjunction with the accompanying drawings.

DETAILED DESCRIPTION OF THE INVENTION

Several embodiments of an objective lens driving apparatus and an optical disk apparatus having the objective lens driving apparatus according to the present invention will be described below using the drawings.

First Embodiment

Figure 1:
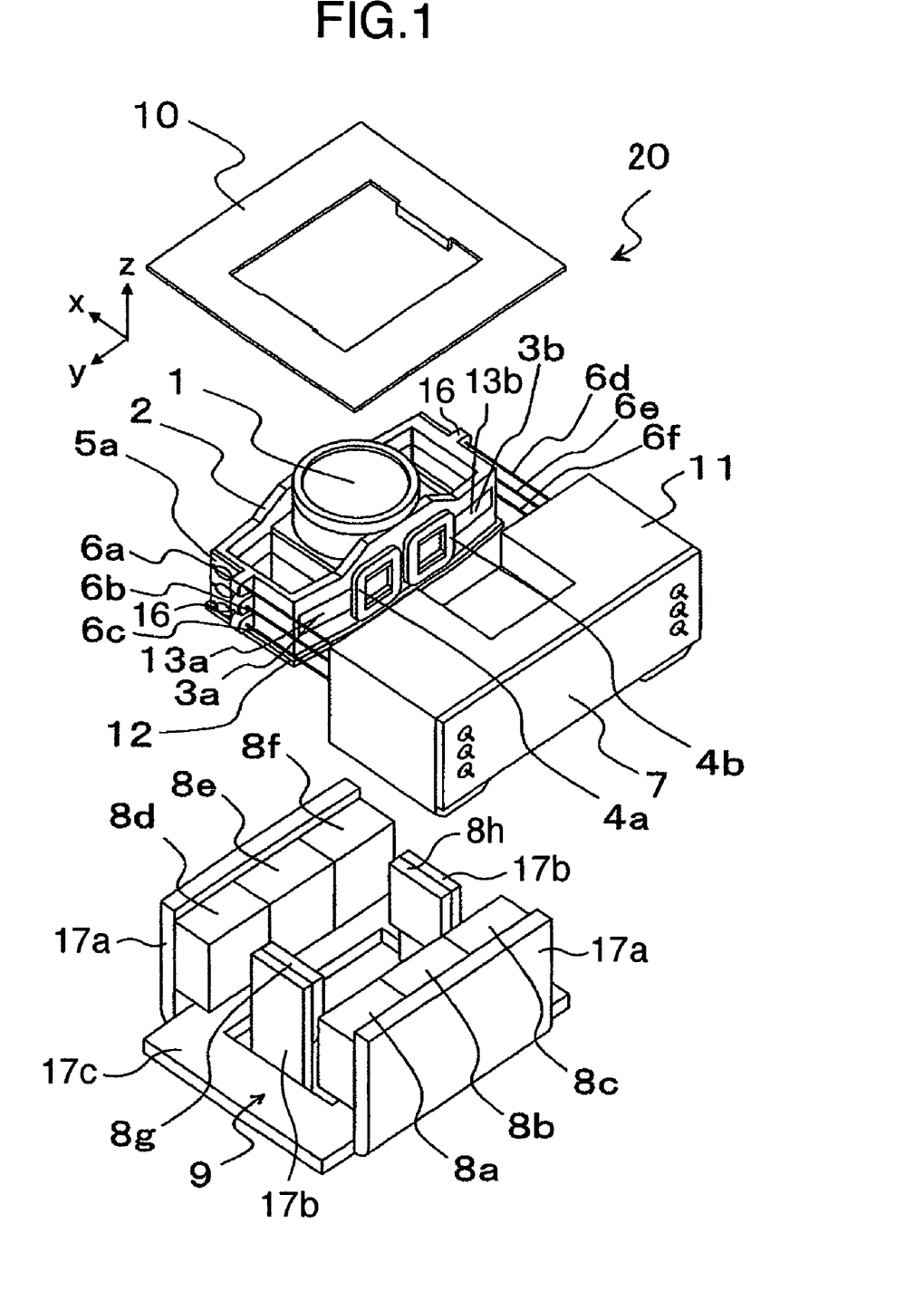
FIG. 1 is an exploded perspective view of an embodiment of an objective lens driving apparatus according to the present invention.
Figure 2:
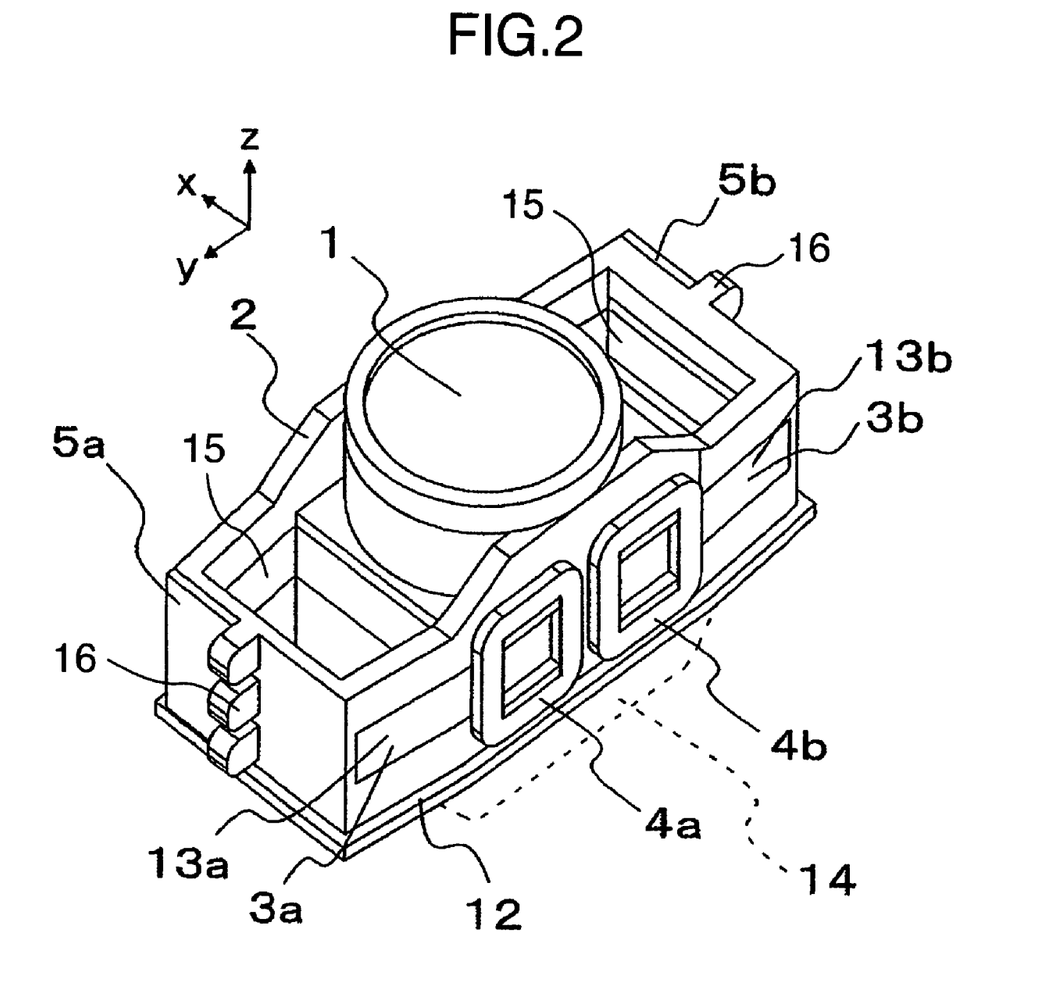
FIG. 2 is a perspective view of an objective lens part used in the objective lens driving apparatus shown in FIG. 1.
Figure 3:
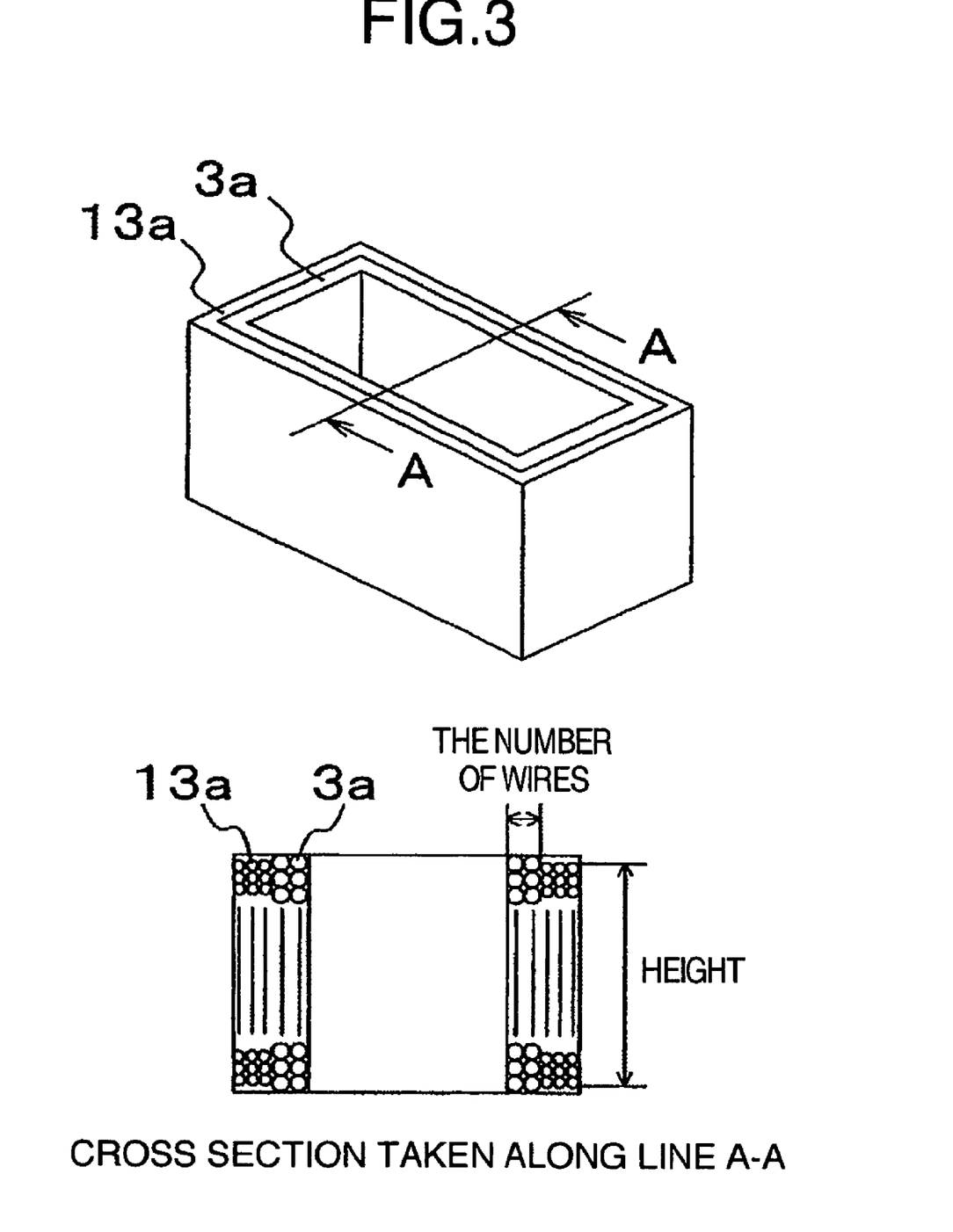
FIG. 3 is a perspective view of a focusing coil and tilt coil used in the embodiment shown in FIG. 1.
Figure 4A:
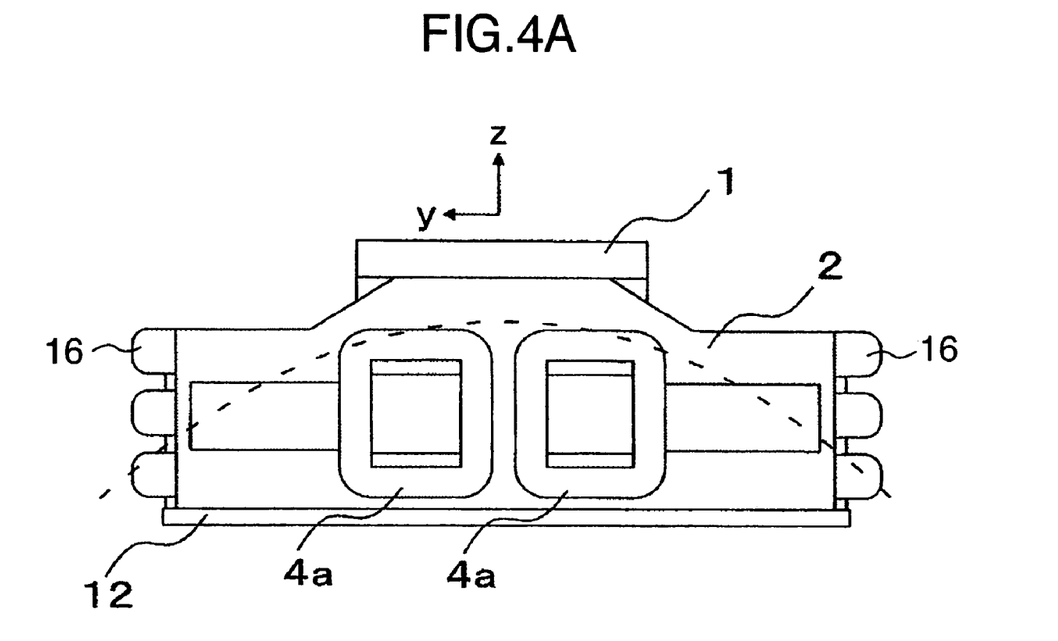
FIGS. 4A and 4B are views for explaining vibration of the objective lens driving apparatus.
Figure 4B:
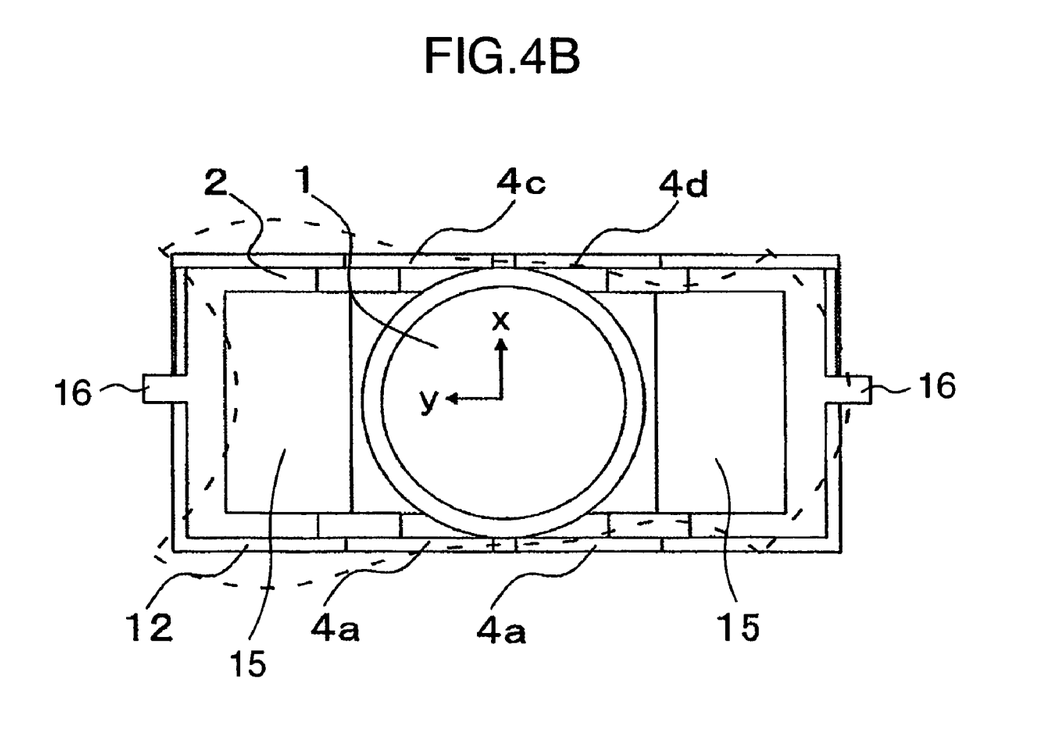
Figure 5:
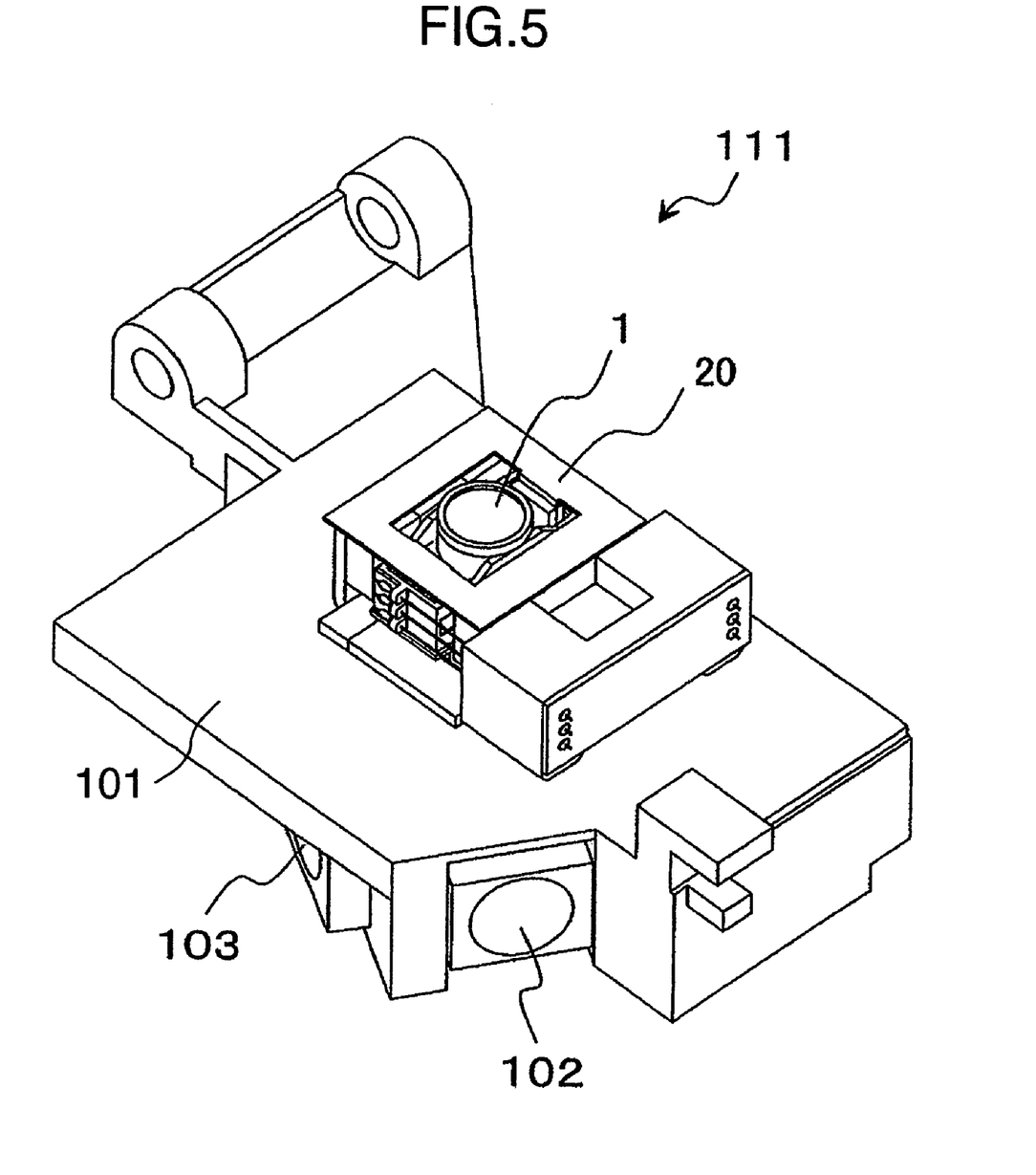
FIG. 5 is a perspective view of an optical pickup on which the objective lens driving apparatus shown in FIG. 1 is mounted.

FIG. 1 is an exploded perspective view of an objective lens driving apparatus 20. FIG. 2 is a perspective view of an objective lens and its surroundings of the objective lens driving apparatus 20 and is a view for explaining a lens holder 2. FIG. 3 is a perspective view of focusing coils 3a and 3b and tilt coils 13a and 13b held by the lens holder 2 shown in FIG. 2. FIGS. 4A and 4B are views of vibration modes of a movable part 20a of the objective lens driving apparatus 20. FIG. 5 is a view of an optical pickup 111 having the objective lens driving apparatus 20 shown in FIG. 1, and FIG. 6, a block diagram of a optical disk apparatus 112 having the optical pickup 111 shown in FIG. 5. In these drawings, the y-axis indicates a tracking direction which is the radial direction of an optical disk (not shown); the x-axis, the in-plane direction of the optical disk which is orthogonal to the y-axis direction; and the z-axis, a focusing direction which is the optical axis direction of an objective lens 1.

In FIG. 1, the focusing coils 3a and 3b, which are rectangular and spiral, are arranged on the both left and right sides (both sides in the y direction) of the objective lens 1. The tilt coils 13a and 13b are respectively arranged around the peripheries of the focusing coils 3a and 3b, concentrically with them. The objective lens 1 and tilt coils 13a and 13b are held in the lens holder 2, which is shaped like a boat.

Two tracking coils 4a and 4b are attached to an outer side surface of the lens holder 2 in the tracking direction (x direction), side-by-side in the y direction. Similarly with the tracking coils 4a and 4b, two tracking coils 4c and 4d are attached to the opposite outer side surface of the lens holder 2, side-by-side in the y direction, as shown in FIGS. 4A and 4B. The objective lens 1, lens holder 2, focusing coils 3 (3a and 3b), and tracking coils 4 (4a to 4d) form a movable part.

Lug parts 16 are formed on both the end faces in the y direction of the lens holder 2. In the example shown in FIG. 1, three lug parts 16 are formed in the vertical direction (z direction) on each side. The lug parts 16 have holes, through which support members 6a to 6f are inserted. Ends of the support members 6a to 6f on the side of the lug parts 16 are fixed on small boards 5a and 5b attached to the lens holder 2.

The other ends of the support members 6a to 6f are electrically connected, with a conductive fusion-bonding material such as solder, to a fixing part 7 which is located at the back of the damping holder 11, which is spaced apart from the lens holder 2. The fixing part 7 is fixed to the damping holder 11. The damping holder 11 is recessed in a middle part on the side of the lens holder 2 and is filled with a viscoelastic material such as silicone gel. The viscoelastic material inside the damping holder 11 provides damping to the support members 6a to 6f.

The ends of the focusing coils 3a and 3b, tracking coils 4a to 4d, and tilt coils 13a and 13b are electrically connected, with the conductive fusion-bonding material such as solder, to the ends of the support members 6a to 6f through the small boards 5a and 5b. Each of the support members 6a to 6f is made of a conductive material and is used to supply current to the focusing coils 3a and 3b, tracking coils 4a to 4d, and tilt coils 13a and 13b.

An upper yoke 10 also serving as the cover for the objective lens driving apparatus 20 is arranged on the upper surface of the lens holder 2. A yoke 9 serving as a magnetic body is arranged on the bottom surface of the lens holder 2. The yoke 9 has a rectangular ring 17c, first upstanding parts 17a extending up in the z-axis direction along two opposing outer edges of the rectangular ring 17c, and second upstanding parts 17b extending up in the z-axis direction along the other two opposing inner edges (without the first upstanding parts 17a) of the rectangular ring 17c. Permanent magnets 8a to 8f (three for each) are attached to the first upstanding parts 17a along the y-axis direction. On the other hand, permanent magnets 8g and 8h are respectively attached to the insides of the second upstanding parts 17b.

The permanent magnets 8a to 8f are magnetized in the x-axis direction, and each two adjacent ones of the magnets are so arranged as to be in opposite phase. The permanent magnets 8g and 8h are magnetized in the y-axis direction and are arranged such that their opposing surfaces are in phase. The upper yoke 10 is attached to the yoke 9, thereby forming a magnetic circuit. With this magnetic circuit, the objective lens 1 can be driven in three axial directions, i.e., the focusing direction, tracking direction, and tilt direction (the rotational direction about the x-axis). The second upstanding parts 17b are inserted through holes 15 in the focusing coils 3a and 3b. The first upstanding parts 17a are so located as to oppose the tracking coils 4a to 4d.

The focusing coil 3a (or 3b) and tilt coil 13a (or 13b) constitute a two-layer coil, as shown in FIG. 3. The wire diameters and the numbers of turns of the focusing coil 3a and tilt coil 13a are set such that the height of the focusing coil 3a on the inside is larger than that of the tilt coil 13a on the outside. The same applies to the focusing coil 3b and tilt coil 13b. When a plurality of two-layer coils are joined, the number of wires constituting the coil layer on the inside is set to an even number.

To form a pair of a tilt coil and focusing coil, the focusing coil 3a (or 3b) and tilt coil 13a (or 13b) may be formed by simultaneously winding wires having two diameters. The use of tow-layer coils makes it possible to integrate the focusing coil 3a (or 3b) and tilt coil 13a (or 13b) into one unit. The workability increases, and the parts count and cost can be decreased. When the focusing coils 3a and 3b and tilt coils 13a and 13b are arranged in the center of the magnetic circuit, the thrust generated by the focusing coils 3a and 3b and tilt coils 13a and 13b can be increased.

In this embodiment, an entire peripheral edge 12 of the bottom surface of the lens holder 2 is projecting. As shown in FIG. 2, parts of the side surfaces opposite in the z direction to the objective lens 1 protrude outward from the outer side surfaces of the lens holder 2. The reason for this will be explained below.

When the objective lens 1 is driven at high speed for tracking or focusing, the vibration mode in the focusing direction shown in FIG. 4A and the vibration mode in the tracking direction shown in FIG. 4B occur as a resonance phenomenon in the movable part. These modes are bending modes in the focusing direction and tracking direction, respectively, as indicated by dotted lines in FIGS. 4A and 4B. Since the lens holder 2 has the holes 15, the bending mode in the x direction is coupled to the bending mode in the tracking direction. To record and play back data at high speed, an increase in resonance frequency is required. More specifically, the resonance frequency needs to exceed the common frequency range.

To increase the resonance frequency, the rigidity of the movable part of the objective lens driving apparatus 20 needs only to be increased. To increase the rigidity of the movable part, it is effective to increase the plate thickness of the lens holder 2. However, since a mere increase in plate thickness causes an increase in mass of the movable part, the thrust per unit mass in the objective lens driving apparatus 20 decreases. When the thrust decreases, the capability to move the objective lens 1 at high speed decreases, and the objective lens 1 cannot be positioned on an optical disk in a predetermined time.

Under the circumstances, this embodiment has as its object to increase the rigidity of the movable part without increasing its mass. More specifically, the part 12 projecting from the side surfaces of the lens holder 2 is formed around the entire peripheral edge of the lens holder 2. The projecting part 12 is made to act as a balance weight which balances with the heavy objective lens 1 in the z direction. Since the movable part is supported by the support members 6a to 6f, the weight of the projecting part 12 is defined such that the barycenter in the z direction of the movable part coincides with the center of support in the z direction of the support members 6a to 6f. This makes it possible to increase the rigidity of the movable part without any additional increase in mass.

When the projecting part 12 is arranged on the side farther from and opposite to the objective lens 1 with respect to the focusing coils 3a and 3b and tracking coils 4a to 4d, it becomes more effective as the balance weight, and a conventional separate balance weight becomes unnecessary. As a result, the weight and size of the movable part decrease. Along with the decrease in weight of the movable part, the thrust per unit mass of the movable part increases, and the objective lens driving apparatus 20 can have lower power consumption than a conventional apparatus.

In FIG. 2, a conventionally used balance weight 14 is indicated by a dotted line. Since the balance weight 14 can be omitted, the dimension in the focusing direction (z direction) of the objective lens driving apparatus 20 can be decreased. In the vibration modes of the lens holder 2, the rigidity of each corner of the holes 15 on which strain energy focuses increases. To prevent the projecting part 12 from hitting the support members 6a to 6f when the movable part moves, the distance between the support member 6a and the support member 6c or between the support member 6d and the support member 6f is set to 3 mm or less.

The projecting part 12 is also used to position the small boards 5a and 5b. More specifically, after the small boards 5a and 5b abut on the projecting part, they are moved in the direction of the lug parts 16 so as to abut on the lug parts 16. This makes it possible to position the small boards 5a and 5b. The ease of assembly can be improved, and the cost can be decreased.

Similarly, the projecting part 12 can be used to position the tracking coils 4a to 4d. In this case, positioning bodies in the form of projections are respectively provided between the tracking coils 4a and 4b and between the tracking coils 4c and 4d for positioning in the y direction. First, the tracking coils 4a to 4d are made to abut on the projections and then are moved in the y direction so as to abut on the positioning bodies. This allows an improvement in ease of assembly and a decrease in cost. The rigidity of the movable part increases with an increase in length by which the projecting part 12 extends outward from the lens holder 2. For this reason, the projecting part is formed in a direction receding from the focusing coils 3a and 3b.

However, if the projecting part 12 is long, the outer dimensions of the movable part increase. Consequently, as for the surfaces opposing the magnets 8a to 8f, the distance between the magnets 8a to 8f and the coils 3a and 3b and 4a to 4d increases. When the distance becomes larger, the thrust significantly decreases. Thus, the length of the projecting part on the surfaces opposing the magnets 8a to 8f is set to 0.1 mm to a value for the distance from the base of the projecting part to the end faces of the tracking coils 4a to 4d opposing the magnets 8a to 8f.

In the aforementioned embodiment, the projecting part 12 has a uniform thickness. However, the projecting part 12 may be formed such that the cross-sectional area decreases as the projecting part 12 recedes from the lens holder 2. For example, the projecting part 12 may have a triangular or trapezoidal cross section. This embodiment uses the two focusing coils 3a and 3b, four tracking coils 4a to 4d, and eight magnets 8a to 8h. The numbers of these components can be set to arbitrary numbers, as needed. Separately wound coils may be used as the focusing coils 3a and 3b and tilt coils 13a and 13b.

FIG. 5 shows an example wherein the objective lens driving apparatus 20 shown in FIG. 1 is mounted on the optical pickup 111. The objective lens driving apparatus 20 is mounted in the optical pickup 111. Light emitted from light-emitting elements 102 and 103 arranged below a base plate 101 at an angle of almost 90° with respect to the base plate 101 passes through the objective lens 1 and is focused on an optical disk. Since the objective lens driving apparatus 20 shown in the above embodiment is used, the resonance frequency of the movable part can be increased to a higher value, and the size and thickness of the optical pickup 111 can be so decreased as to be suitable for recording/playing back data at high speed. In the optical pickup 111, since the projecting part 12 of the lens holder 2 also acts as a balance weight, a balance weight need not be provided separately. The size and weight of the movable part decrease, and the thrust per unit mass can be increased.

Since the balance weight part becomes smaller, the height in the z direction of the lens holder 2 can be decreased, and the objective lens driving apparatus 20 becomes thinner. The position of the objective lens is limited by an optical disk 113. However, when the lens holder 2 becomes thinner, the position in a direction of height (z direction) of the bottom surface of the yoke 9 increases, and the bottom surface of the optical pickup 111 rises.

Figure 6:
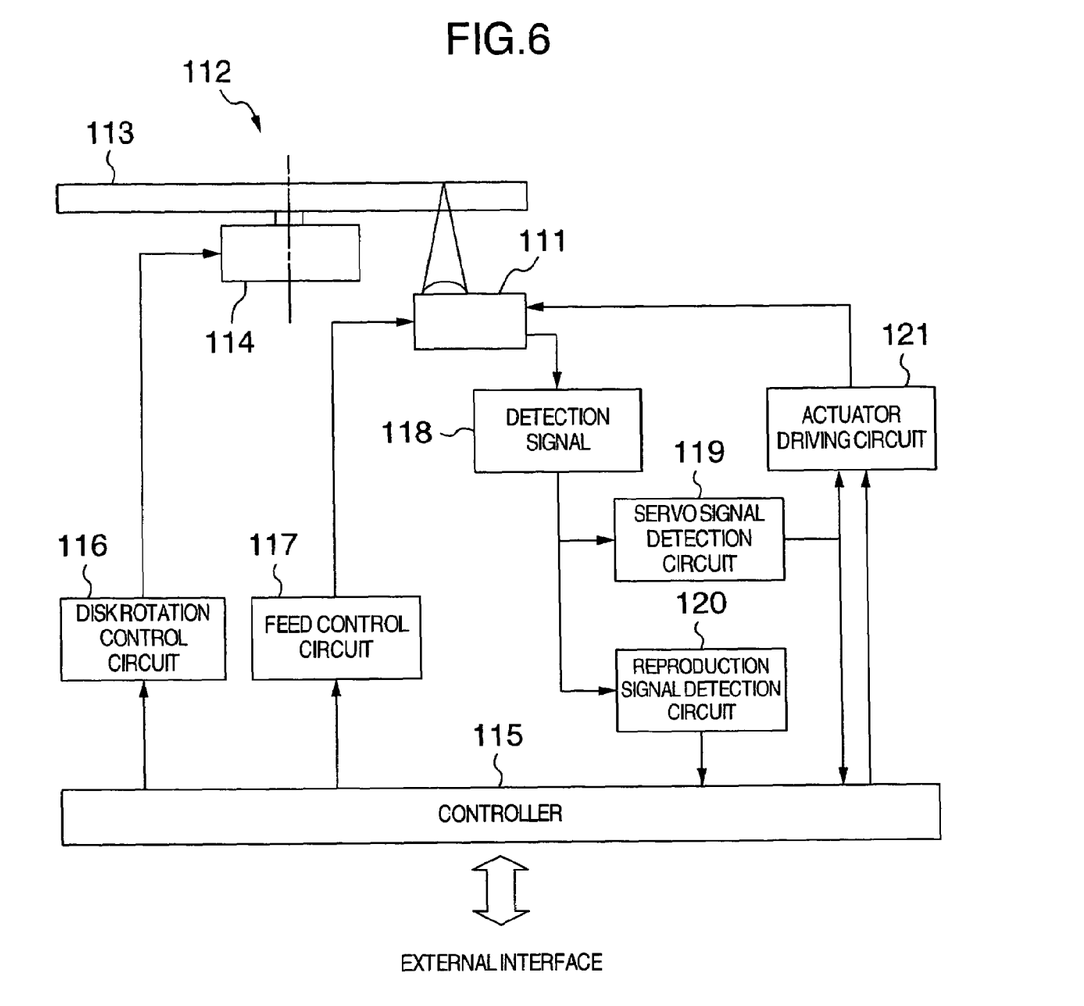
FIG. 6 is a block diagram of an optical disk apparatus having the optical pickup shown in FIG. 5.

FIG. 6 shows a block diagram of the optical disk apparatus 112 which uses the optical pickup 111 shown in FIG. 5. The optical disk apparatus 112 has the optical pickup 111 and a spindle motor 114 which rotates the optical disk 113. The optical pickup 111 is moved in the radial direction of the optical disk 113 by a feed mechanism. The spindle motor 114, feed mechanism, and optical disk 113 are controlled by a controller 115.

A rotation control circuit 116 of the spindle motor 114 and a feed control circuit 117 of the optical pickup 111 are connected to the controller 115. The controller 115 controls the rotation of the optical disk 113 attached to the spindle motor 114. The controller 115 also controls the optical pickup 111 to move in the radial direction of the optical disk 113.

Various signals 118 detected by the optical pickup 111 are sent to a servo signal detection circuit 119 and reproduction signal detection circuit 120. The servo signal detection circuit 119 generates a focus error signal and track error signal and sends them to an actuator driving circuit 121. The actuator driving circuit 121 controls the position of the objective lens 1 in accordance with an instruction from the controller 115 and a signal from the servo signal detection circuit 119. The reproduction signal detection circuit 120 plays back information recorded on the optical disk. According to this embodiment, the servo band of the optical pickup 111 can be raised to a higher one, and the optical pickup 111 can be thinned.

Accordingly, the optical disk apparatus 112 becomes suitable for high-speed data recording/playback. The size and thickness of the optical disk apparatus 112 can be decreased, and at the same time, its performance can be improved.

Second Embodiment

Figure 7A:
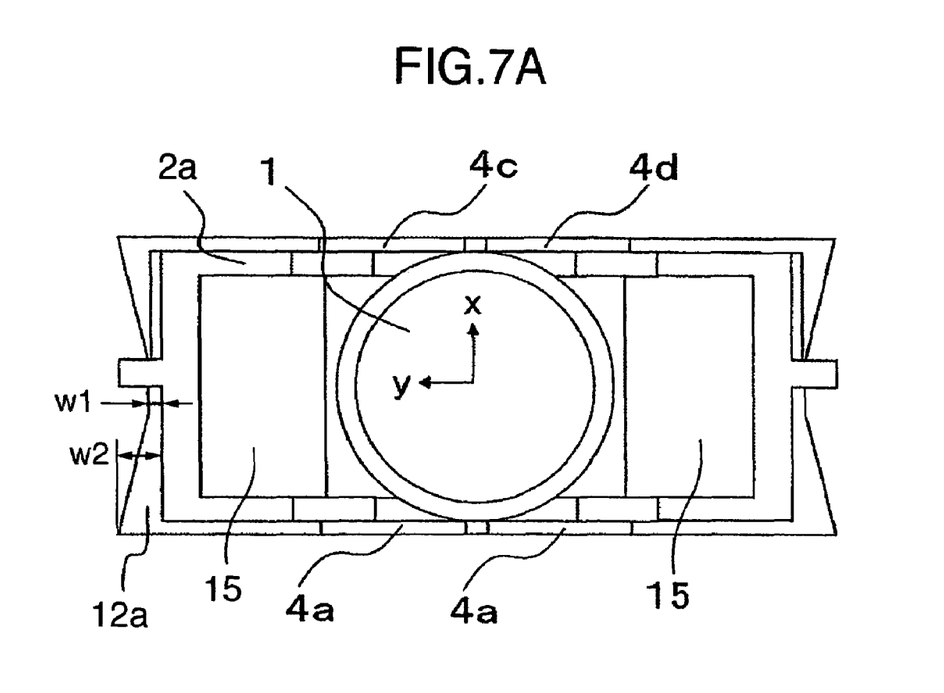
FIGS. 7A and 7B are a top view and side view, respectively, of another embodiment of a lens holder according to the present invention.
Figure 7B:
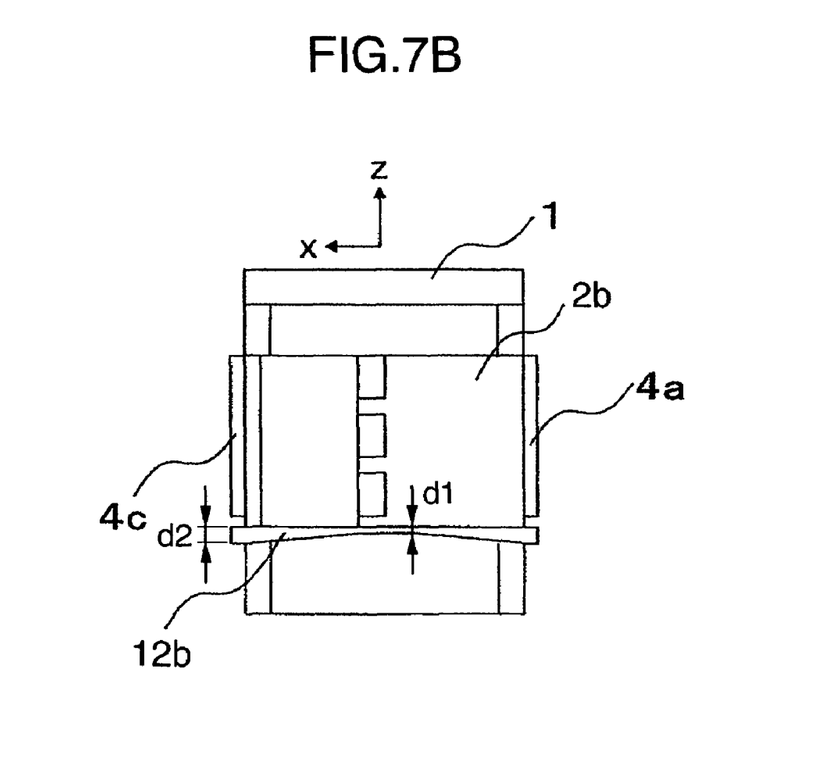

FIGS. 7A and 7B show a top view and side view, respectively, of another embodiment of a lens holder according to the present invention. This embodiment is different from the embodiment shown in FIG. 2 in structure around a lens holder 2a. More specifically, to increase the rigidity of the lens holder 2a, the rigidity of the corners of holes 15 is increased, and the rigidity of middle parts in the x direction between the corners is not much increased. This is because the middle parts in the x direction between the corners do not contribute much to an increase in rigidity.

As shown in FIG. 7A, for a decrease in weight of a movable part, a projection length w1 of the projecting part 12a at each middle part in the x direction is decreased, and a projection length w2 at each corner is increased. At this time, the projecting part 12a may have an angulated shape or rounded shape. To increase the rigidity of the corners, a plate thickness d1 at each middle part of a projecting part 12b may be decreased, and a plate thickness d2 at each corner may be increased, as shown in FIG. 7B. With these arrangements of the projecting parts 12a and 12b, the rigidity of the movable part increases, and the weight of the movable part can be decreased. As a result, the resonance frequency can be shifted to a higher value, and the thrust per unit mass can be increased. According to this embodiment, the objective lens driving apparatus is suitable for high-speed data recording/playback.

Third Embodiment

Figure 8:
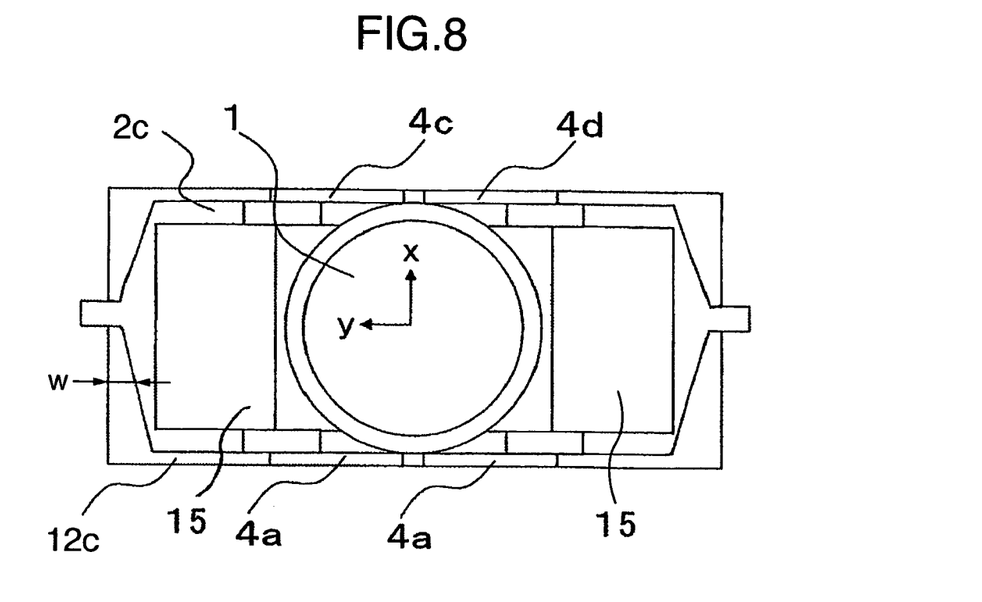
FIG. 8 is a top view of still another embodiment of a lens holder according to the present invention.

FIG. 8 shows a top view of still another embodiment of a lens holder according to the present invention. In this embodiment, a projecting part 12c has a different shape from those in the aforementioned embodiments. The shape of the inner periphery of a projecting part 12c is differentiated from those in the aforementioned embodiments. In the inner periphery of a projecting part 12c, a part from a middle part in the x direction to each corner is shaped into a trapezoid such that a projection length w of the projecting part 12c changes in the x direction. The shape of the part of the lens holder 2c is not limited to a trapezoidal shape and may have a rounded shape. Since the lens holder 2c has chamfered corners, there is no possibility that support members 6a to 6f hit the lens holder 2c even when a movable part follows an optical disk 113 and is displaced in the tracking direction. With this arrangement, extra space for moving the support members 6a to 6f becomes unnecessary, and the length in the width direction (y direction) of the movable part can be decreased. More specifically, the rigidity of the movable part can be increased without increasing the size of the movable part. The size and weight of the movable part can be decreased. As a result, the resonance frequency can be shifted to a higher value, and the thrust per unit mass can be increased.

Figure 9:
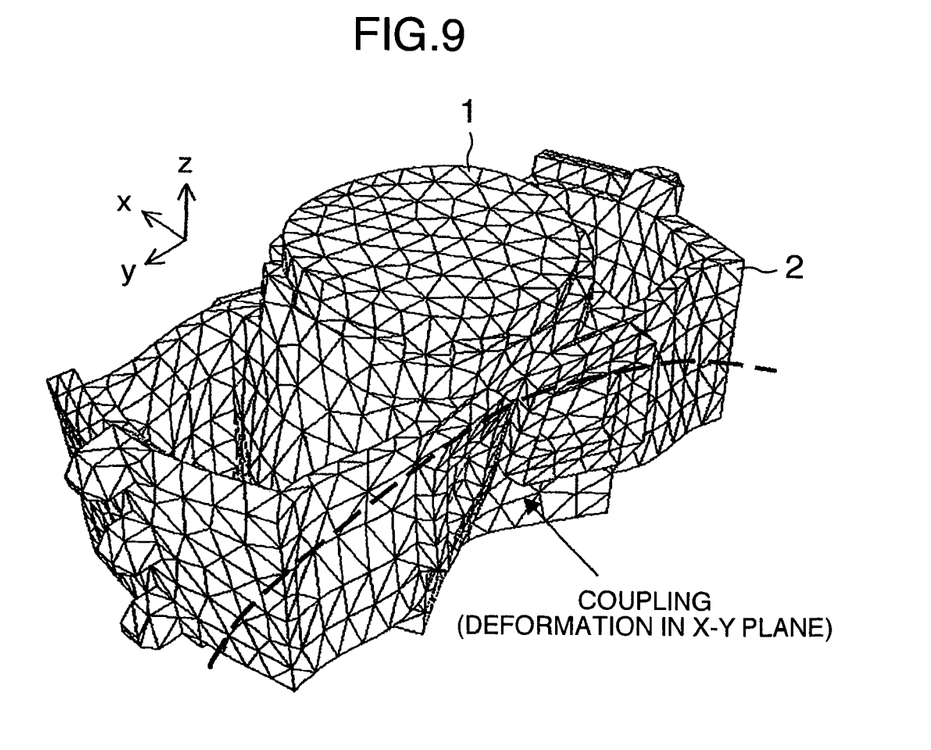
FIG. 9 is a view for explaining vibration of an objective lens driving apparatus.

The aforementioned embodiments have described that each projecting part suppresses the vibration mode in the tracking direction. In these embodiments, the vibration mode in the focusing direction can also be suppressed. FIG. 9 shows a calculation result of the vibration mode in the focusing direction of a lens holder 2 without any projecting part. The result shows the occurrence of coupled vibration (deformation in the x-y plane). As can be seen from this, the formation of a projecting part makes it possible to increase the resonance frequency in the focusing direction as much as that in the tracking direction.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An objective lens driving apparatus comprising an objective lens which focuses light on a recording surface of an optical disk and is held by a lens holder, a focusing coil which drives said objective lens in directions approaching and receding from the optical disk, and a tracking coil which drives said objective lens in a radial direction of the optical disk, wherein the lens holder is shaped like a box having a bottom plate and opposite side surfaces, and the focusing coils are arranged on opposite sides of the objective lens so that the opposite side surfaces are orthogonal to a direction passing substantially through the centers of the focusing coils and the objective lens, the bottom plate having an entire peripheral edge which is extended from a periphery of side surfaces of the box to form a projecting part having one of (a) an extending length that is shorter in a middle part thereof than in end parts thereof along each of the opposite side surfaces of the lens holder and (b) a thickness that is thinner in a middle part thereof than in end parts thereof along each of the opposite side surfaces of the lens holder.

2. The apparatus according to claim 1, wherein the focusing coils are arranged on both left and right sides, respectively, of said objective lens, and the projecting part has one of an arrangement in which a projection length at a side middle part in a juxtaposition direction of the two focusing coils is smaller than a projection length at an end in the direction and an arrangement in which a projection thickness at the side middle part in the juxtaposition direction of the two focusing coils is smaller than a projection thickness at the end.

3. The apparatus according to claim 2, wherein a width of the projecting part in a direction of juxtaposition of the two focusing coils gradually decreases from the side middle part to the end in the direction.

4. The apparatus according to claim 1, wherein said focusing coils comprise a space in a direction of an optical axis.

5. The apparatus according to claim 1, wherein the projecting part serves as a balance weight in a direction of an optical axis of said objective lens.

6. An objective lens driving apparatus as set forth in claim 1, wherein the extending length of the projecting part is gradually increased from the middle part to both ends along each of the side surfaces of the lens holder.

7. An optical disk apparatus which plays back information of an optical disk and records information on the optical disk, the optical disk apparatus comprising an objective lens driving apparatus according to claims 1 or 6.

* * * * *